(12) United States Patent
Zheng et al.

(10) Patent No.: US 12,400,309 B2
(45) Date of Patent: Aug. 26, 2025

(54) COMBINING DEFECT NEURAL NETWORK WITH LOCATION NEURAL NETWORK

(71) Applicant: UnitX, Inc., Santa Clara, CA (US)

(72) Inventors: Weixiong Zheng, Santa Clara, CA (US); Kedao Wang, Santa Clara, CA (US)

(73) Assignee: UnitX, Inc., Santa Clara, CA (US)

( * ) Notice: Subject to any disclaimer, the term of this patent is extended or adjusted under 35 U.S.C. 154(b) by 362 days.

(21) Appl. No.: 18/119,151

(22) Filed: Mar. 8, 2023

(65) Prior Publication Data

US 2024/0303794 A1    Sep. 12, 2024

(51) Int. Cl.
*G06K 9/00* (2022.01)
*G06T 7/00* (2017.01)
*G06T 7/70* (2017.01)

(52) U.S. Cl.
CPC .............. *G06T 7/0002* (2013.01); *G06T 7/70* (2017.01); *G06T 2200/24* (2013.01); *G06T 2207/20081* (2013.01); *G06T 2207/20084* (2013.01); *G06T 2207/20104* (2013.01)

(58) Field of Classification Search
CPC . G06T 2207/20084; G06T 2207/20081; G06T 7/0002; G06T 7/70; G06T 7/0004; G06T 2200/24; G06T 2207/20104
See application file for complete search history.

(56) References Cited

U.S. PATENT DOCUMENTS

2006/0245636 A1    11/2006    Kitamura et al.
2017/0076224 A1*   3/2017     Munawar ............... G06N 3/045
2017/0323163 A1*   11/2017    Leung ................ G06F 18/24133
2018/0028294 A1*   2/2018     Azernikov ......... G06F 18/24143
2018/0211373 A1    7/2018     Stoppa et al.
2018/0322623 A1*   11/2018    Memo .................... G06N 3/084
2019/0073568 A1*   3/2019     He ........................... G06T 7/001

(Continued)

FOREIGN PATENT DOCUMENTS

KR         102317992       10/2021
KR       20210129775       10/2021

OTHER PUBLICATIONS

"International Application Serial No. PCT US2023 026628, International Search Report mailed Dec. 4, 2023", 3 pgs.

(Continued)

*Primary Examiner* — Hadi Akhavannik
(74) *Attorney, Agent, or Firm* — Schwegman Lundberg & Woessner, P.A.

(57) ABSTRACT

In an example embodiment, two different neural networks are used in conjunction with each other to identify defects in items appearing in images. More particularly, a defect neural network is trained on images labeled with an indication of a defect type (or no defect) appears in an item in the image (with optionally an identification of the area in which the defect appears). Separately, a location neural network is trained on images that have a specific geometric shape (e.g., point, line, circle) labeled in the image. The labels identify not just the pixels that are part of the shape, but also provide a value that indicates a degree of the identification of the location. Surrounding pixels to the identified shapes are then given values according to a distribution that is based on distance from the shape, with the peak values being those pixels that are exactly on the identified shape.

20 Claims, 10 Drawing Sheets

(56) References Cited

U.S. PATENT DOCUMENTS

| | | | |
|---|---|---|---|
| 2019/0108396 A1* | 4/2019 | Dal Mutto | G06V 20/52 |
| 2019/0172207 A1* | 6/2019 | Odry | G06V 10/82 |
| 2019/0220972 A1 | 7/2019 | Iwanaga | |
| 2020/0126210 A1* | 4/2020 | Li | G06F 16/532 |
| 2020/0160505 A1* | 5/2020 | Kohler | G06T 7/11 |
| 2020/0175352 A1* | 6/2020 | Cha | G06N 3/04 |
| 2020/0364842 A1* | 11/2020 | Chaton | G06N 3/04 |
| 2021/0073972 A1* | 3/2021 | Wu | G06N 3/08 |
| 2021/0370993 A1* | 12/2021 | Qian | B61L 23/042 |

OTHER PUBLICATIONS

"International Application Serial No. PCT US2023 026628, Written Opinion mailed Dec. 4, 2023", 5 pgs.

* cited by examiner

| 13 | 14 | 16 | 17 | 17 | 19 | 21 | 23 | 26 | 28 | 28 | 31 | 28 | 26 | 23 | 21 | 19 | 17 | 17 | 16 | 14 | 13 | 12 | 11 |
|---|---|---|---|---|---|---|---|---|---|---|---|---|---|---|---|---|---|---|---|---|---|---|---|
| 14 | 16 | 17 | 19 | 19 | 21 | 23 | 26 | 28 | 31 | 35 | 31 | 28 | 26 | 23 | 21 | 19 | 19 | 17 | 16 | 14 | 13 | 12 | |
| 16 | 17 | 19 | 21 | 21 | 23 | 26 | 28 | 31 | 35 | 38 | 35 | 31 | 28 | 26 | 23 | 21 | 19 | 17 | 16 | 14 | 13 | | |
| 17 | 19 | 21 | 23 | 23 | 26 | 28 | 31 | 35 | 38 | 42 | 38 | 35 | 31 | 28 | 26 | 23 | 21 | 19 | 17 | 16 | 14 | | |
| 19 | 21 | 23 | 26 | 26 | 28 | 31 | 35 | 38 | 42 | 51 | 42 | 38 | 35 | 31 | 28 | 26 | 23 | 21 | 19 | 17 | 16 | | |
| 21 | 23 | 26 | 28 | 28 | 31 | 35 | 38 | 42 | 51 | 56 | 51 | 42 | 38 | 35 | 31 | 28 | 26 | 23 | 21 | 19 | 17 | | |
| 23 | 26 | 28 | 31 | 31 | 35 | 38 | 42 | 51 | 56 | 62 | 56 | 51 | 42 | 38 | 35 | 31 | 28 | 26 | 23 | 21 | 19 | | |
| 26 | 28 | 31 | 35 | 35 | 38 | 42 | 51 | 56 | 62 | 68 | 62 | 56 | 51 | 42 | 38 | 35 | 31 | 28 | 26 | 23 | 21 | | |
| 28 | 31 | 35 | 38 | 38 | 42 | 51 | 56 | 62 | 68 | 75 | 68 | 62 | 56 | 51 | 42 | 38 | 38 | 35 | 31 | 28 | 26 | 23 | |
| 31 | 35 | 38 | 42 | 42 | 51 | 56 | 62 | 68 | 75 | 82 | 75 | 68 | 62 | 56 | 51 | 42 | 42 | 38 | 35 | 31 | 28 | 26 | |
| 35 | 38 | 42 | 46 | 51 | 56 | 62 | 68 | 75 | 82 | 90 | 82 | 75 | 68 | 62 | 56 | 51 | 46 | 42 | 38 | 35 | 31 | 28 | |
| 38 | 42 | 46 | 51 | 56 | 62 | 68 | 75 | 82 | 90 | 99 | 90 | 82 | 75 | 68 | 62 | 56 | 51 | 46 | 42 | 38 | 35 | 31 | |
| 35 | 38 | 42 | 46 | 51 | 56 | 62 | 68 | 75 | 82 | 90 | 82 | 75 | 68 | 62 | 56 | 51 | 46 | 42 | 38 | 35 | 31 | 28 | |
| 31 | 35 | 38 | 42 | 46 | 51 | 56 | 62 | 68 | 75 | 82 | 75 | 68 | 62 | 56 | 51 | 46 | 42 | 38 | 35 | 31 | 28 | 26 | |
| 28 | 31 | 35 | 38 | 42 | 46 | 51 | 56 | 62 | 68 | 75 | 68 | 62 | 56 | 51 | 46 | 42 | 38 | 35 | 31 | 28 | 26 | 23 | |
| 26 | 28 | 31 | 35 | 38 | 42 | 46 | 51 | 56 | 62 | 68 | 62 | 56 | 51 | 46 | 42 | 38 | 35 | 31 | 28 | 26 | 23 | 21 | |
| 23 | 26 | 28 | 31 | 35 | 38 | 42 | 46 | 51 | 56 | 62 | 56 | 51 | 46 | 42 | 38 | 35 | 31 | 28 | 26 | 23 | 21 | 19 | |
| 21 | 23 | 26 | 28 | 31 | 35 | 38 | 42 | 46 | 51 | 56 | 51 | 46 | 42 | 38 | 35 | 31 | 28 | 26 | 23 | 21 | 19 | 17 | |
| 19 | 21 | 23 | 26 | 28 | 31 | 35 | 38 | 42 | 46 | 51 | 46 | 42 | 38 | 35 | 31 | 28 | 26 | 23 | 21 | 19 | 17 | 16 | |
| 17 | 19 | 21 | 23 | 26 | 28 | 31 | 35 | 38 | 42 | 46 | 42 | 38 | 35 | 31 | 28 | 26 | 23 | 21 | 19 | 17 | 16 | 14 | |
| 16 | 17 | 19 | 21 | 23 | 26 | 28 | 31 | 35 | 38 | 42 | 38 | 35 | 31 | 28 | 26 | 23 | 21 | 19 | 17 | 16 | 14 | 13 | |
| 14 | 16 | 17 | 19 | 21 | 23 | 26 | 28 | 31 | 35 | 38 | 35 | 31 | 28 | 26 | 23 | 21 | 19 | 17 | 16 | 14 | 13 | 12 | |
| 13 | 14 | 16 | 17 | 19 | 21 | 23 | 26 | 28 | 31 | 35 | 31 | 28 | 26 | 23 | 21 | 19 | 17 | 16 | 14 | 13 | 12 | 11 | |
| 12 | 13 | 14 | 16 | 17 | 19 | 21 | 23 | 26 | 28 | 31 | 28 | 26 | 23 | 21 | 19 | 17 | 16 | 14 | 13 | 12 | 11 | 10 | |

| 10 | 11 | 12 | 13 | 14 | 15 | 16 | 17 | 19 | 20 | 22 | 24 | 26 | 28 | 30 | 32 | 34 | 37 | 40 | 42 | 45 | 48 | 51 | 55 |
|---|---|---|---|---|---|---|---|---|---|---|---|---|---|---|---|---|---|---|---|---|---|---|---|
| 12 | 13 | 14 | 15 | 16 | 18 | 19 | 21 | 23 | 24 | 26 | 29 | 31 | 33 | 36 | 38 | 41 | 44 | 47 | 50 | 53 | 57 | 60 | 64 |
| 15 | 16 | 17 | 18 | 20 | 21 | 23 | 25 | 27 | 29 | 32 | 34 | 37 | 39 | 42 | 45 | 49 | 52 | 56 | 59 | 63 | 67 | 70 | 74 |
| 18 | 19 | 20 | 22 | 24 | 26 | 28 | 30 | 32 | 35 | 38 | 41 | 43 | 47 | 50 | 53 | 57 | 61 | 65 | 68 | 72 | 76 | 80 | 84 |
| 21 | 23 | 25 | 27 | 29 | 31 | 33 | 36 | 39 | 42 | 45 | 48 | 51 | 55 | 58 | 62 | 66 | 70 | 74 | 78 | 82 | 86 | 89 | 93 |
| 25 | 27 | 30 | 32 | 34 | 37 | 39 | 42 | 46 | 49 | 52 | 56 | 60 | 63 | 67 | 70 | 75 | 79 | 83 | 87 | 90 | 93 | 95 | 97 |
| 30 | 33 | 35 | 38 | 41 | 44 | 47 | 50 | 53 | 57 | 61 | 65 | 69 | 73 | 77 | 81 | 85 | 88 | 92 | 94 | 96 | 97 | 97 | 95 |
| 36 | 39 | 42 | 45 | 48 | 51 | 55 | 58 | 62 | 66 | 70 | 75 | 79 | 82 | 86 | 90 | 93 | 96 | 98 | 99 | 98 | 96 | 93 | 90 |
| 43 | 46 | 49 | 53 | 56 | 60 | 63 | 67 | 71 | 76 | 80 | 84 | 87 | 90 | 93 | 96 | 97 | 97 | 96 | 94 | 92 | 88 | 84 | 80 |
| 51 | 54 | 58 | 61 | 65 | 69 | 73 | 77 | 81 | 85 | 89 | 92 | 94 | 96 | 97 | 97 | 96 | 93 | 90 | 87 | 83 | 79 | 75 | 71 |
| 59 | 63 | 67 | 71 | 75 | 79 | 83 | 87 | 90 | 94 | 96 | 98 | 99 | 98 | 96 | 94 | 90 | 86 | 82 | 78 | 74 | 70 | 66 | 62 |
| 68 | 72 | 76 | 80 | 84 | 87 | 91 | 94 | 96 | 97 | 98 | 96 | 94 | 92 | 88 | 85 | 81 | 77 | 73 | 69 | 65 | 61 | 57 | 53 |
| 78 | 82 | 86 | 89 | 92 | 95 | 97 | 98 | 97 | 96 | 93 | 90 | 87 | 84 | 80 | 76 | 71 | 67 | 63 | 59 | 56 | 52 | 49 | 45 |
| 88 | 91 | 95 | 97 | 98 | 99 | 99 | 97 | 94 | 90 | 87 | 83 | 79 | 75 | 70 | 66 | 62 | 58 | 55 | 51 | 48 | 44 | 41 | 38 |
| 95 | 97 | 98 | 98 | 97 | 95 | 92 | 89 | 85 | 81 | 77 | 73 | 69 | 65 | 61 | 57 | 53 | 50 | 46 | 43 | 40 | 38 | 35 | 32 |
| 99 | 99 | 97 | 95 | 91 | 88 | 84 | 80 | 76 | 72 | 68 | 63 | 60 | 56 | 52 | 49 | 46 | 42 | 39 | 37 | 3 | 32 | 29 | 27 |
| 95 | 92 | 89 | 86 | 82 | 78 | 74 | 70 | 66 | 62 | 58 | 54 | 51 | 48 | 44 | 41 | 38 | 36 | 33 | 31 | 29 | 26 | 24 | 22 |
| 87 | 84 | 80 | 76 | 72 | 68 | 64 | 61 | 57 | 53 | 50 | 46 | 43 | 40 | 37 | 35 | 32 | 30 | 28 | 26 | 24 | 22 | 20 | 19 |
| 79 | 75 | 71 | 67 | 63 | 59 | 56 | 52 | 49 | 45 | 42 | 39 | 37 | 34 | 32 | 29 | 27 | 25 | 23 | 21 | 20 | 8 | 17 | 15 |
| 69 | 65 | 61 | 58 | 54 | 51 | 47 | 44 | 41 | 38 | 36 | 33 | 31 | 28 | 26 | 24 | 22 | 21 | 19 | 18 | 16 | 15 | 14 | 13 |
| 60 | 56 | 53 | 49 | 46 | 43 | 40 | 37 | 35 | 32 | 30 | 28 | 26 | 24 | 22 | 20 | 19 | 17 | 16 | 15 | 14 | 12 | 11 | 11 |
| 51 | 48 | 45 | 42 | 39 | 36 | 34 | 31 | 29 | 27 | 25 | 23 | 21 | 20 | 18 | 17 | 15 | 14 | 13 | 12 | 11 | 10 | 9 | 9 |
| 44 | 41 | 38 | 35 | 33 | 30 | 28 | 26 | 24 | 22 | 21 | 19 | 18 | 16 | 15 | 14 | 13 | 12 | 11 | 10 | 9 | 9 | 8 | 7 |

COMBINING DEFECT NEURAL NETWORK WITH LOCATION NEURAL NETWORK

TECHNICAL FIELD

This application relates generally to machine learning. More particularly, this application relates to the combination of a defect neural network with a location neural network.

BACKGROUND

Machine learning can be used in a variety of applications to perform various classification actions on digital images. One such classification is to identify "defects" in items appearing in the digital images. For example, a manufacturer may capture images of a product or part on an assembly line and use a machine learning model to identify whether the product or part has a defect that necessitates correction or destruction of the product.

Traditionally, training of such models has utilized two-dimensional images, but most of the products or parts being evaluated are three dimensional in nature, and have points, lines, and curves that may not be easily understood by a model trained using only two-dimensional images.

BRIEF DESCRIPTION OF DRAWINGS

FIG. 5 is a diagram illustrating an example of labels for an image used to train the location neural network, in accordance with an example embodiment.

FIG. 6 is a diagram illustrating an example of labels for an image used to train the location neural network 114, in accordance with another example embodiment.

DETAILED DESCRIPTION

The description that follows includes illustrative systems, methods, techniques, instruction sequences, and computing machine program products that have illustrative embodiments. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

In an example embodiment, two different neural networks are used in conjunction with each other to identify defects in items appearing in images. More particularly, a defect neural network is trained on images labeled with an indication of a defect type (or no defect) appears in an item in the image (with optionally an identification of the area in which the defect appears). Separately, a location neural network is trained on images that have a specific geometric shape (e.g., point, line, circle) labeled in the image. The labels for the images used to train the location neural network further identify not just the pixels that are part of the shape, but also provide a value (other than a binary value) that indicates a strength or level of the identification of the location. Surrounding pixels to the identified shapes are then given values according to a function whose output decreases based on distance from the shapes, with the peak values being those pixels that are exactly inside the identified shape and surrounding pixels having lower and lower values as they extend away from those pixels that are exactly on the identified shape. The result is that the location neural network is able to precisely predict areas of interest in an image, and that the output of the location neural network can be combined with the output of the defect neural network to identify the type and location of any defects in items in an input image.

In a further example embodiment, labeling of training images, and specifically the labeling of images used to train the defect neural network training component, is performed using an interactive labeler. The interactive labeler is a graphical user interface that permits a user to not only indicate the presence and type of a defect of an item in an image, but also allows the user to specifically select the pixels of the image that depict the defect. In some example embodiments, the graphical user interface provides an interface where the user can draw a circle around the pixels of the image that contain the defect. Thus, the user can draw a bounding shape and all pixels within that bounding shape are indicated as containing a defect (or not containing a defect, depending on the labeling). This region is termed a region of interest. In some example embodiments, these regions can be further labeled with either positive (no defect, perfect, etc.) or negative (defective, etc.) labels.

Figure 1:
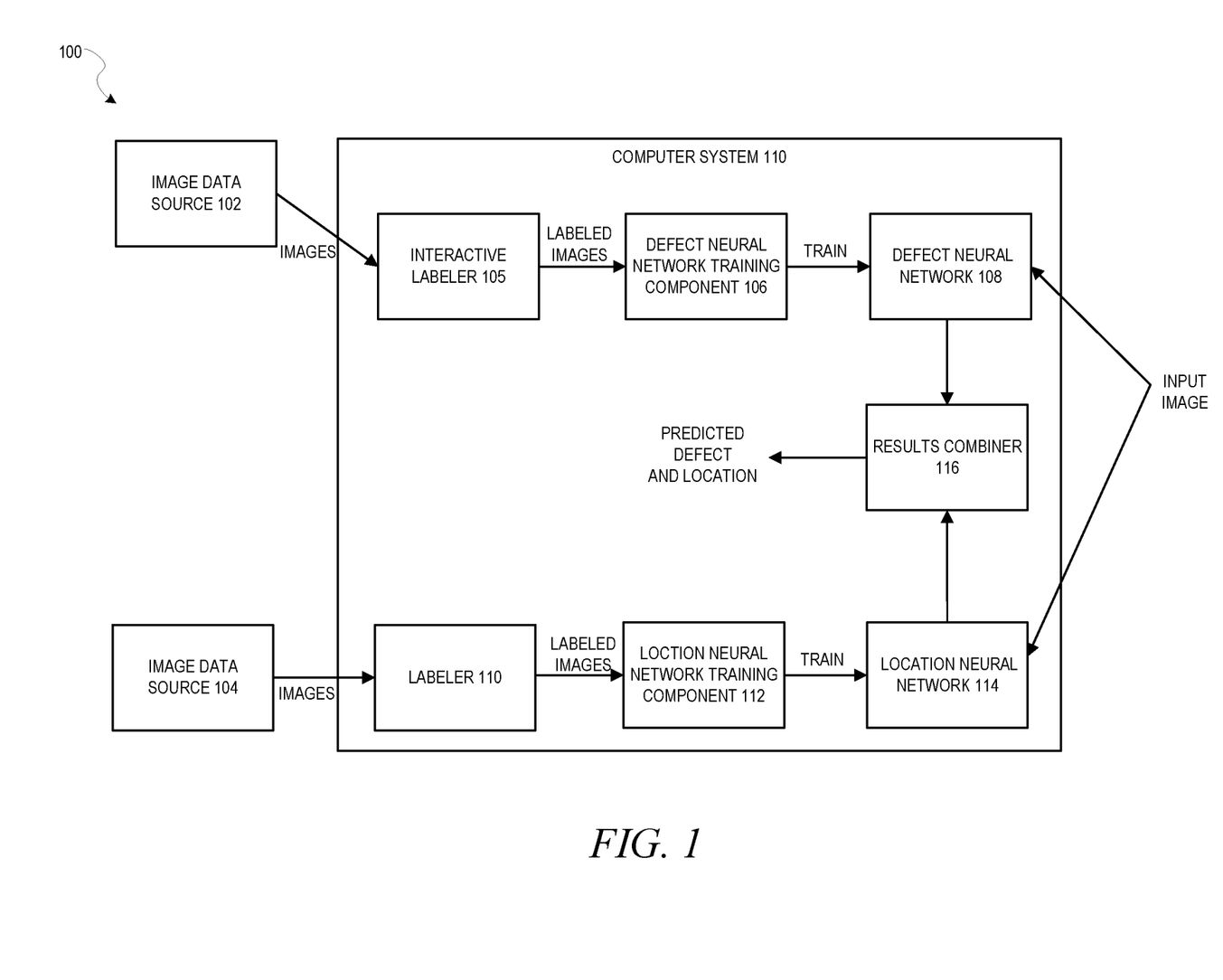
FIG. 1 is a block diagram illustrating a system, in accordance with an example embodiment.

FIG. 1 is a block diagram illustrating a system 100, in accordance with an example embodiment. System 100 includes image data source 102 and image data source 104, both of which provide image data (e.g., files containing images) for training purposes. Here, image data source 102 is depicted as providing images that will eventually be used to train a defect neural network while image data source 104 is depicted as providing images that will eventually be used to train a location neural network, although there need not be such a rigid separation of the data sources or even be multiple data sources. In some example embodiments, images from either of the image data sources 102, 104 can be used to train any of the neural networks, and in some example embodiments there is only a single image data source 102 providing images for training all of the neural networks.

In an example embodiment, images from the image data source 102 are passed to an interactive labeler 105, which, as described above, is a graphical user interface allowing the user to identify regions of interest in the images by drawing boundaries around the regions of interest, and also to provide labels for those regions of interest. The labeled images are then passed to a defect neural network training component 106, which uses a machine learning algorithm to train a defect neural network 108 to identify defects.

Separately, images from the image data source 104 are passed to labeler 110. Labeler 110 acts to add location labels using a distribution based on a function whose output decreases based on distance from specific geometric shapes, such as points, lines, and circles. While this labeler 110 may be interactive, it is interactive in a different way than as described with respect to the interactive labeler 105. Specifically, the geometric shapes themselves represent the regions of interest, as opposed to be bounding shapes around a region of interest. Thus, while a circle drawn by a user using the interactive labeler 105 may indicate a region of interest including all pixels within that circle (e.g., the entire area of the circle), a circle drawn by a user using the labeler 110 may indicate that the line of the circle is the region of interest, and then the labeler 110 acts to add a distribution around that line.

The labeled images from the labeler 110 are then passed to the location neural network training component 112, which uses a machine learning algorithm to train a location neural network 114 to identify locations of interest in images. The machine learning algorithm used to train the location neural network 114 may or may not be the same machine learning algorithm used to train the defect neural network 108.

At evaluation time, one or more images are obtained, such as ones that someone or some component has identified as being ones in which defects of items depicted in the images should be detected. These images are then passed to both the defect neural network 108 and the location neural network 114, which, for each image, make two separate predictions related to the image. The defect neural network 108 identifies a type of defect (if any) present in the image, while the location neural network 114 identifies a location of interest in the image. These two results are then combined by a results combiner 116, to predict both a type and location of defect (if any).

In an example embodiment, the results combiner 116 constitutes one or more scripts that operate to combine the results of the defect neural network 108 and the location neural network 114. It essentially merges the results using custom rules. In an example embodiment, the script can be defined by a user via a user interface.

In an example embodiment, one or both of the defect neural network 108 and the location neural network 114 is a Deep Convolutional Neural Network (DCNN). A DCNN is a machine-learning model that effectively infers nonlinear relationships between a homogeneous input field and desired outputs, which are either categorical classes or scalars. The DCNN is a model that maps inputs to outputs using a sequence of so-called convolutional layers of artificial neurons. The DCNN may be trained by presenting it with a large number (e.g., greater than 10,000) of sample data and labels. It is trained to minimize the discrepancy (or "loss") between the mode's output and the desired output. After the training, the model may be applied to new input images to produce a useful prediction of the professionalism levels of the new input images.

The DCNN is designed to learn not only to classify images or groupings of images, but also to learn a feature hierarchy by defining a number of layers. The process of inference involves taking a given input, applying a sequence of mathematical functions called layers, and calculating the functions on the input data. Each layer extracts features from the output of a previous layer, and all layers are trained jointly. The layer-based architecture is why it is termed a "deep" convolutional neural network.

Figure 2:
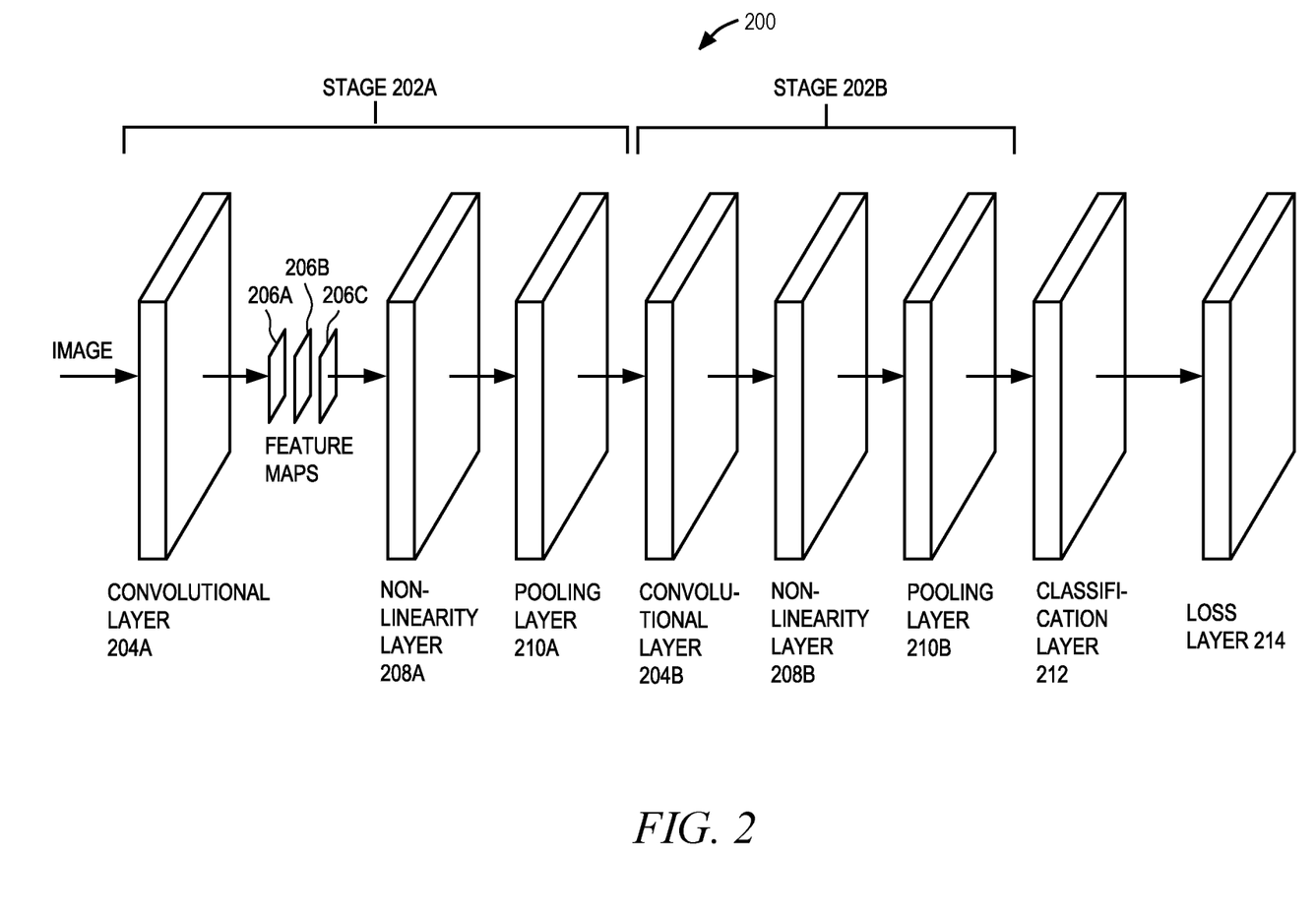
FIG. 2 is a diagram illustrating a Deep Convolutional Neural Network (DCNN), in accordance with an example embodiment.

In an example embodiment, five different types of layers are utilized. The first four layers are the convolutional layer, the nonlinearity layer, the pooling layer, and the classification layer (although the classification is just a special case of convolution followed by "softmax"). These first four layers may be considered to be a stage, and the DCNN may actually be designed to have any number of these stages. Once the stages are all complete, a loss layer is used. FIG. 2 is a diagram illustrating a DCNN 200, in accordance with an example embodiment. Here, two stages 202A, 202B are depicted.

Convolutional layers 204A, 204B are the core of the DCNN 200. Their parameters include a set of learnable filters that have a small receptive field but extend through the full depth of the input data. During a forward pass in a convolutional layer 204A, 204B, each filter is convolved across the features, computing the dot product between the entries of the filter and the input, and producing a 2-dimensional activation map of that filter. As a result, the DCNN 200 learns filters that activate when they see some specific type of feature.

The feature maps for all filters can be stacked along the depth dimension to form the full volume output of the convolutional layers 204A, 204B.

The convolutional layers 204A, 204B apply mathematical operations called convolutionals. For two spatial dimensions and an indeterminate amount of non-spatial dimensions (referred to as "channels"), the convolutional is defined using the * operator as follows:

$$y[n, m, d] = x * f = \sum_{o} \sum_{j=-M, k=-N}^{j=M, k=N} x[n, m, o] f_d[n-k, m-j, o]$$

The convolutional layers 204A, 204B will typically have some very small support, e.g., N=1 and M=1, such that g[n, m, d]=0 if |n|>1 or |m|>1.

It should be noted that the filters used in the convolutional layers 204A, 204B may be activated in a first iteration of the DCNN 200 and refined prior to each additional iteration, based on actions taken in other layers in the previous iteration, until some error term is minimized below a particular threshold. In one example embodiment, this may be accomplished through back propagation, which is described in more detail below.

The output of the convolutional layers 204A, 204B are sets of arrays called feature maps 206A-206C. Each feature map 206A-206C may be produced by a different filter and modified based on various functions in each stage. At the output, each feature map 206A-206C represents a particular feature extracted at all locations on the input and conditioned. The example in FIG. 2 is of a two-stage system, although one of ordinary skill in the art will recognize that more or fewer stages could be used while still being consistent with the present disclosure, and indeed as will be seen in an example embodiment, the number of stages may be dynamically determined at runtime to optimize results.

Nonlinearity layers 208A, 208B give the DCNN 200 greater expressive power in uncovering nonlinear relationships between input and output. Many different nonlinearities could be used in the nonlinearity layer, including sigmoid, tanh, and rectified linear function. For brevity, one example of nonlinearity will be described here: the rectified linear function. This function is defined by the following:

$$y(x) = \begin{cases} x \text{ if } x > 0 \\ 0 \text{ if } x < 0 \end{cases}$$

Pooling layers 210A, 210B are applied to lower the input image's spatial dimensions while preserving some information from the input image. In other words, the pooling layers 210A, 210B do not actually do any of the learning, i.e., they are a fixed predefined operation that does not change as training progresses. Instead, they are used as the spatial dimensions of the problem. In one example embodiment, a decimation approach could be followed, where one out of every N sample along a spatial dimension is kept out. In another example embodiment, some local statistics may be used for pooling, such as max pooling, defined as:

$$Y[n, m, d] = \max_{|n'|<N, |m'|<M} x[n+n', m+m', d]$$

where N=M=2.

When all the stages 202A, 202B are complete, a classification layer 212 is used to classify the image using the output of the final pooling layer 210B. As stated above, the classification layer 212 is actually a specialized convolutional layer containing a filter designed to produce the score from the volume output of the final pooling layer 210B. This filter applies a classification function having weights that may be refined in the same manner as the weights in the functions of the filters of the normal convolutional layers 204A, 204B.

Back propagation involves calculating a gradient of a loss function (defined later) in a loss layer 214, with respect to a number of weights in the DCNN 200. The gradient is then fed to a method that updates the weights for the next iteration of the training of the DCNN 200 in an attempt to minimize the loss function, which uses a different plurality of sample data (unless there is a need to repeat, such as running out of sample data). Back propagation uses the labeled sample data in a batch of sample data that have been passed through the stages 202A, 202B in order to calculate the loss function gradient for the samples as a group (although, as will be seen later, the loss function may be modified dynamically to eliminate some of the samples from consideration).

Back propagation may include two aspects: propagation and weight update. In the propagation aspect, forward propagation of a training pattern's input images is performed through the DCNN 200 in order to generate the propagation's output activations (i.e., the images are passed through the stages 202A, 202B). Then, backward propagation of the propagation's output activations is performed through the DCNN 200 using a target specified by the training pattern in order to generate the deltas of all output.

In the weight update aspect, for each weight of each filter, the output delta and input activation are multiplied to obtain the gradient of the weight, and then a ratio of the gradient is subtracted from the weight. The ratio influences speed and quality of learning. The higher the ratio, the faster the training, but at the expense of accuracy.

Thus, these two aspects, including both the forward pass and the backward pass through the stages 202A, 202B, are performed repeatedly until the error rate is below a particular threshold. An example of back propagation algorithms compatible with the DCNN 200 include, for example, gradient descent.

The use of the back propagation may be predicated on whether the combined error of the classification of the images in the batch of labeled sample data transgressed a preset error threshold. If the combined error is too great, then back propagation should occur to update, and hopefully minimize, the error for the next iteration and a next iteration is performed with a subsequent batch of labeled sample data, until the combined error does not transgress the threshold.

As described above, the classification may be scored for the data. The DCNN 200 outputs a vector that may be compared to the desired output of some loss function, such as the sum square error function:

$$\text{loss} = \sum_i (\hat{l}_i - l_i)^2$$

Figure 3:
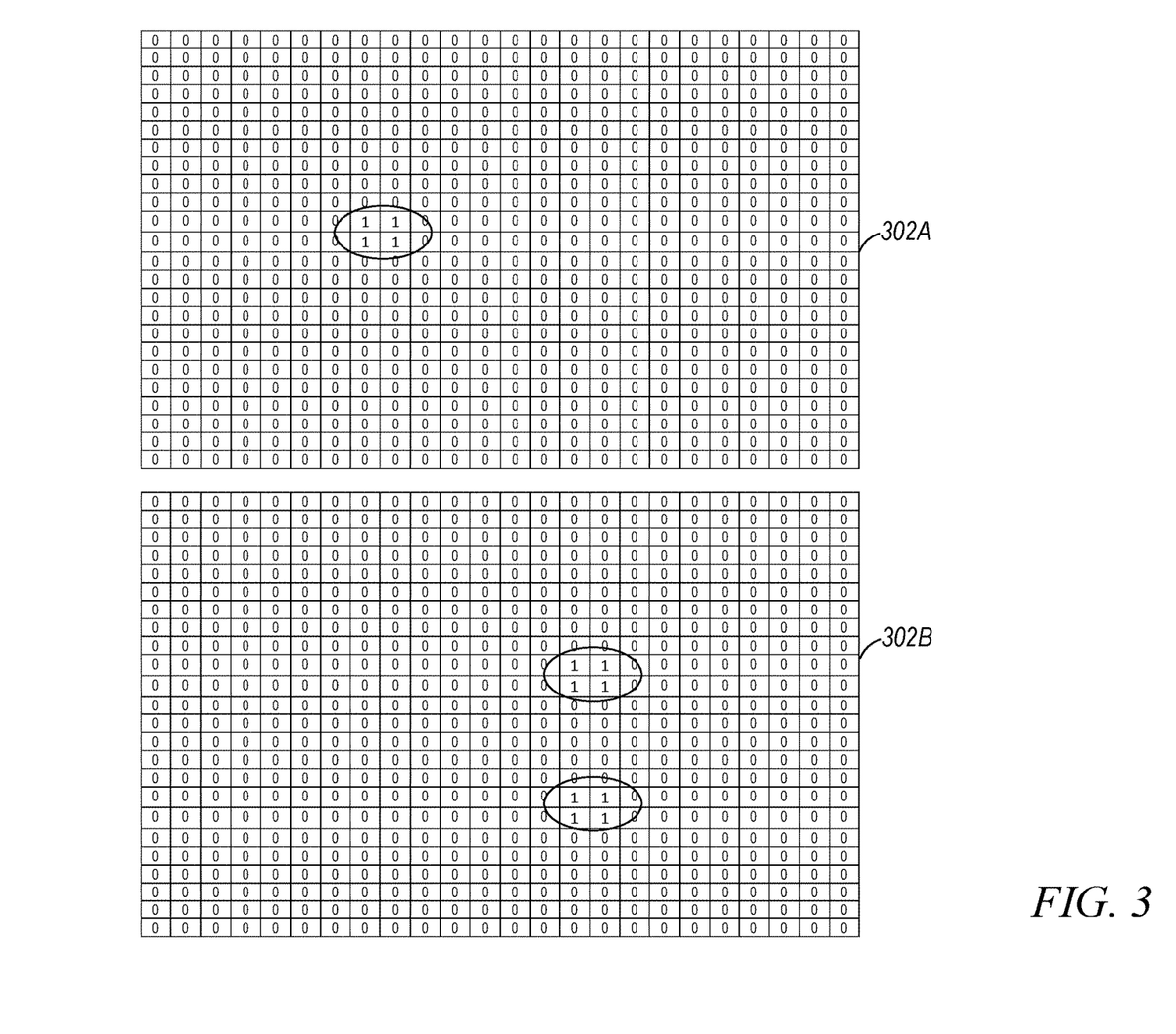
FIG. 3 is a diagram illustrating an example of labels for an image used to train the defect neural network, in accordance with an example embodiment.

FIG. 3 is a diagram illustrating an example of labels for an image used to train the defect neural network 108 of FIG. 1, in accordance with an example embodiment. Here, multiple label masks 302A, 302B are used as the labels. The label masks 302A, 302B, when overlayed over the image, identify defects in certain pixels and the types of the defects based on a value, in the label mask 302A, 302B, corresponding to each pixel of the label portion. In this example embodiment, there may be a different label mask 302A, 302B for each type of defect, allowing the values in the label mask 302A, 302B to be binary. Thus, for example, there may be one label mask 302A for "cracks" defects and a separate label mask 302B for "excessive wear" defects.

Notably, the label masks 302A, 302B only contains 0s and 1s, and thus does not provide any ability to track any sort of "degree" of the defect or even degree of likelihood of a defect at the pixel. Each pixel is simply labeled as depicting a specific type of defect or not depicting the specific type of defect.

Figure 4:
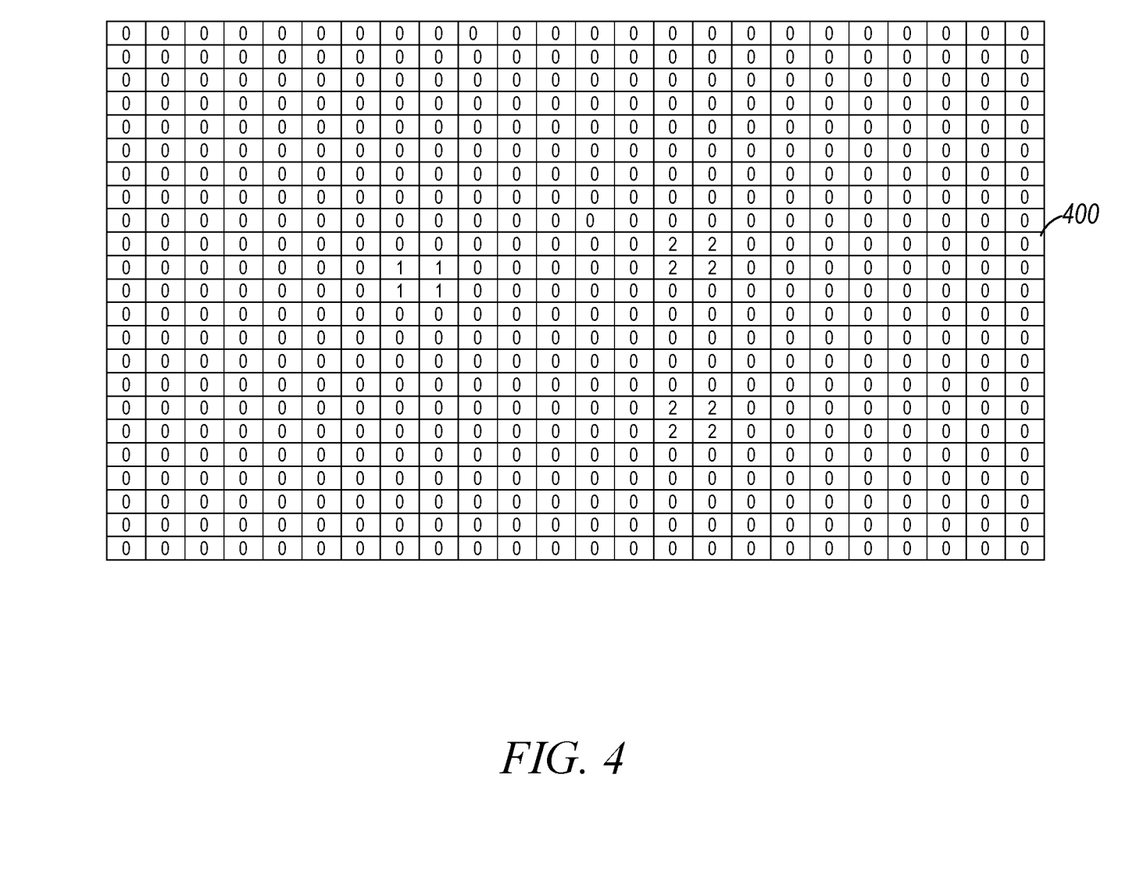
FIG. 4 is a diagram illustrating another example of labels for an image used to train the defect neural network, in accordance with another example embodiment.

FIG. 4 is a diagram illustrating another example of labels for an image used to train the defect neural network 108 of FIG. 1, in accordance with another example embodiment. Here, rather than having separate label masks for an image, as in FIG. 3, there is a single label mask 400 for all label types. Here, the value in a pixel of the single label mask 400 indicates either that the pixel does not depict a defect, or the type of the defect the pixel contains. Here, for example, a pixel value of 0 in a pixel indicates that the pixel does not depict a defect, a pixel value of 1 in a pixel indicates that the pixel depicts a defect of the "cracks" defect type, whereas a pixel value of 2 in a pixel indicates that the pixel depicts a defect of the "excessive wear" defect type.

Notably, the label masks 400 only values indicating the presence or not of various defect types, and like in FIG. 3, does not provide any ability to track any sort of "degree" of the defect or even degree of likelihood of a defect at the pixel.

FIG. 5 is a diagram illustrating an example of labels for an image used to train the location neural network 114 of FIG. 1, in accordance with an example embodiment. Again, the labeled image constitutes an image and a label mask 500, although the label mask 500 means something completely different than the label masks in FIGS. 3 and 4. Here, the label mask 500 includes a peak value at a point 502 identified by a user as being a point of interest. This peak value is assigned the highest value in the label mask 500 (e.g., 99). Pixels surrounding this point, in all directions, are assigned lower and lower values, as they extend away from the point 502, until they are far enough away that they are assigned a value of 0. As such, even though the user has identified only point 502 as a region of interest, the system has essentially labeled surrounding pixels as regions of interest as well, but at lesser and lesser degrees as they extend away from the point 502.

The decreasing values around the point may be based on the output of a function whose output decreases based on distance from the point. One such function may be a "star function," in which pixel distance is counted based on a combination of horizontal and vertical distance from the point, rather than absolute geometric distance. Thus, for example, a pixel that is 2 pixels above another pixel along the vertical axis but on exactly the same point on the horizontal axis would count as 2 pixels away, as would a pixel that is one pixel above and one pixel to the right of the other pixel (even though in the latter case, the geometric distance would be less than 2 pixels away). The values in FIG. 5 are calculated based on such a star function. Other distributions based on distance are possible as well, such as a Gaussian distribution.

FIG. 6 is a diagram illustrating an example of labels for an image used to train the location neural network 114, in accordance with another example embodiment. Again, the labeled image constitutes an image portion and a label mask 600, although the label mask 600 depicts a line 602 of interest rather than a point of interest. Values on this line 602 are the peak value in the label mask 600. This peak value is assigned the highest value in the label mask 600 (e.g., 99). Pixels surrounding this line 602, in all directions, are assigned lower and lower values as they extend away from the line 602, until they are far enough away that they are assigned a value of 0. As such, even though the user has identified only line 602 as a region of interest, the system has essentially labeled surrounding pixels as regions of interest as well, but at lesser and lesser degrees as they extend away from the line 602.

Figure 7:
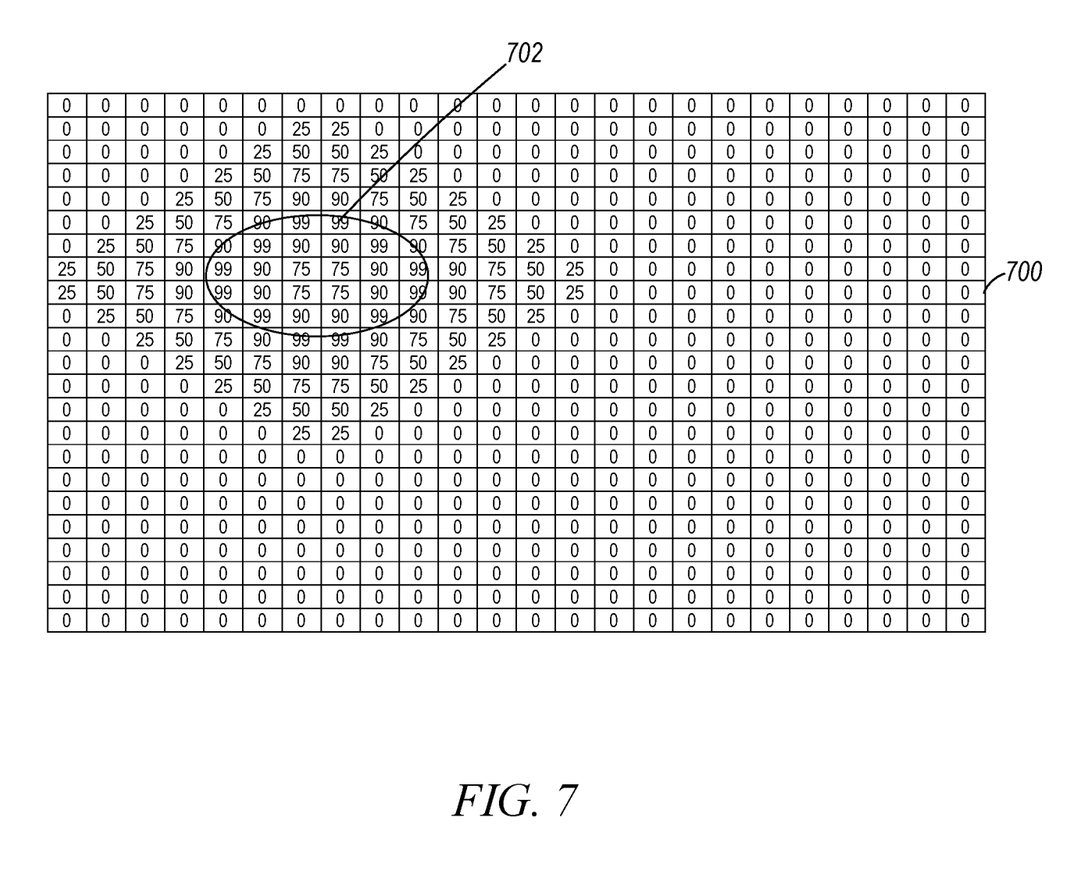
FIG. 7 is a diagram illustrating an example of labels for an image used to train the location neural network, in accordance with another example embodiment.

FIG. 7 is a diagram illustrating an example of labels for an image used to train the location neural network 114 of FIG. 1, in accordance with another example embodiment. Again, the labeled image constitutes an image portion and a label mask 700, although the label mask 700 depicts a circle 702 of interest rather than a line or point of interest. Values on this circle 702 are the peak value in the label mask 700. This peak value is assigned the highest value in the label mask 700 (e.g., 99). Pixels surrounding this circle 702, in all directions, are assigned lower and lower values as they extend away from the circle 702, until they are far enough away that they are assigned a value of 0. As such, even though the user has identified only circle 702 as a region of interest, the system has essentially labeled surrounding pixels as regions of interest as well, but at lesser and lesser degrees as they extend away from the circle 702.

It should be noted that while points, lines, and circles are shown in these figures, example embodiments are not limited to these three types of geometric shapes, and indeed any two dimensional geometric shape may be identified by a user as being a region of interest.

Figure 8:
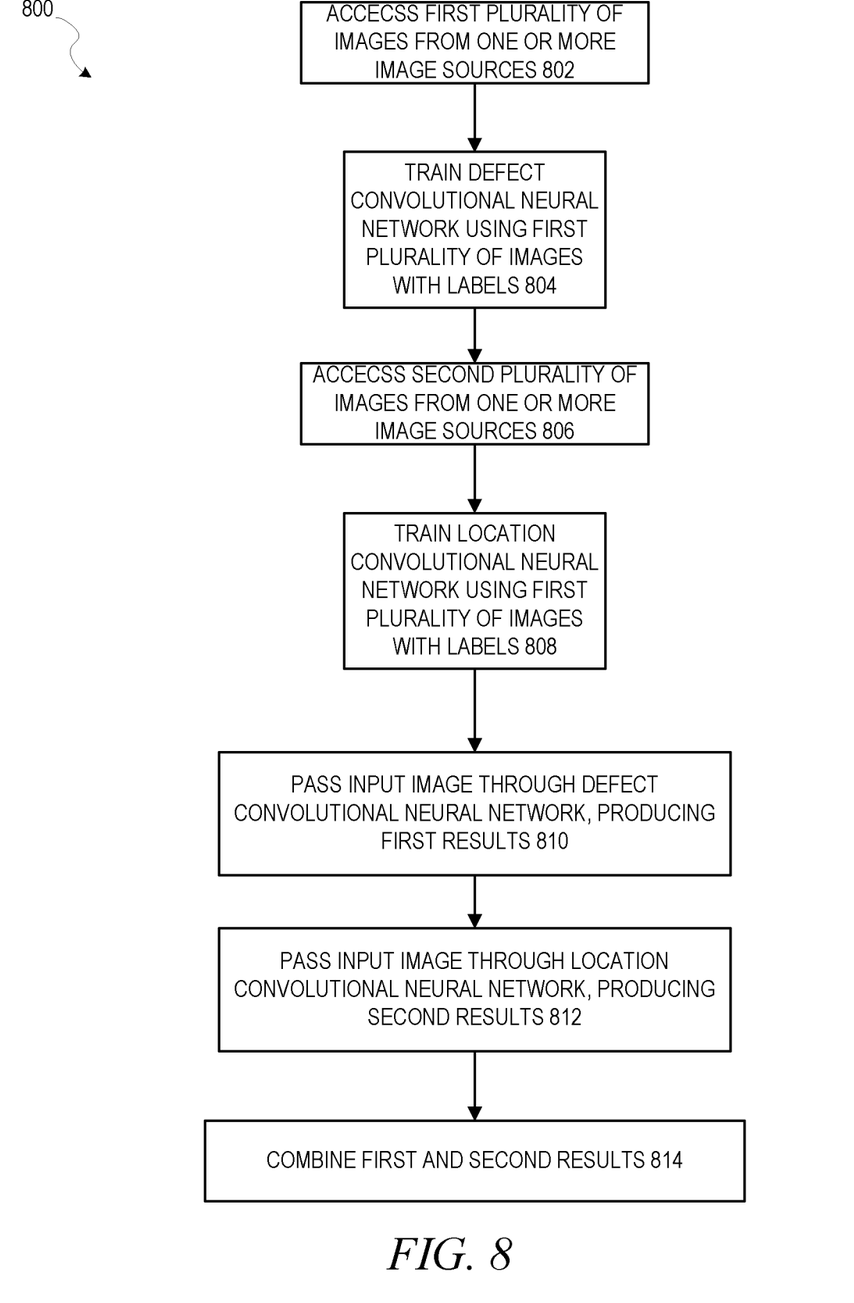
FIG. 8 is a flow diagram illustrating a method of training multiple neural networks, in accordance with an example embodiment.

FIG. 8 is a flow diagram illustrating a method 800 of training multiple neural networks, in accordance with an example embodiment. At operation 802, a first plurality of images are accessed from one or more data sources. At operation 804, a defect convolutional neural network is trained using the first plurality of images and a plurality of defect label masks. Each defect label mask identifies, for each pixel of a corresponding image, whether the pixel depicts a portion of a defect of one or more defect types. At operation 806, a second plurality of images is accessed from the one or more data sources. At operation 808, a location convolutional neural network is trained using the second plurality of images and a plurality of location label masks. Each location label mask identifies, for each pixel of a corresponding image, a degree in which the pixel depicts a region of interest, the degree being at a maximum for pixels located on a geometric shape specified on the corresponding image by a user, the degree being assigned based on a distance from the geometric shape for pixels surrounding the pixels located on the geometric shape.

The distribution may be based on a function whose output decreases based on distance from the shape, such as Gaussian distribution or a star distribution.

The distribution pattern, either the type of distribution itself or parameters of the distribution, such as steepness, may also be varied based on various factors. Such factors may include, for example, the type of the detected shape (e.g., a different distribution may be used for points as for lines), and the type of the application (e.g., different steepness may be used based on the type of inspection being performed on the image).

At operation 810, an input image is passed through the defect convolutional neural network, producing first results. At operation 812, the input image is passed through the location convolutional neural network, producing second results. At operation 814, the first and second results are combined to provide a prediction of a location and type of one or more defects in items depicted in the input image.

Figure 9:
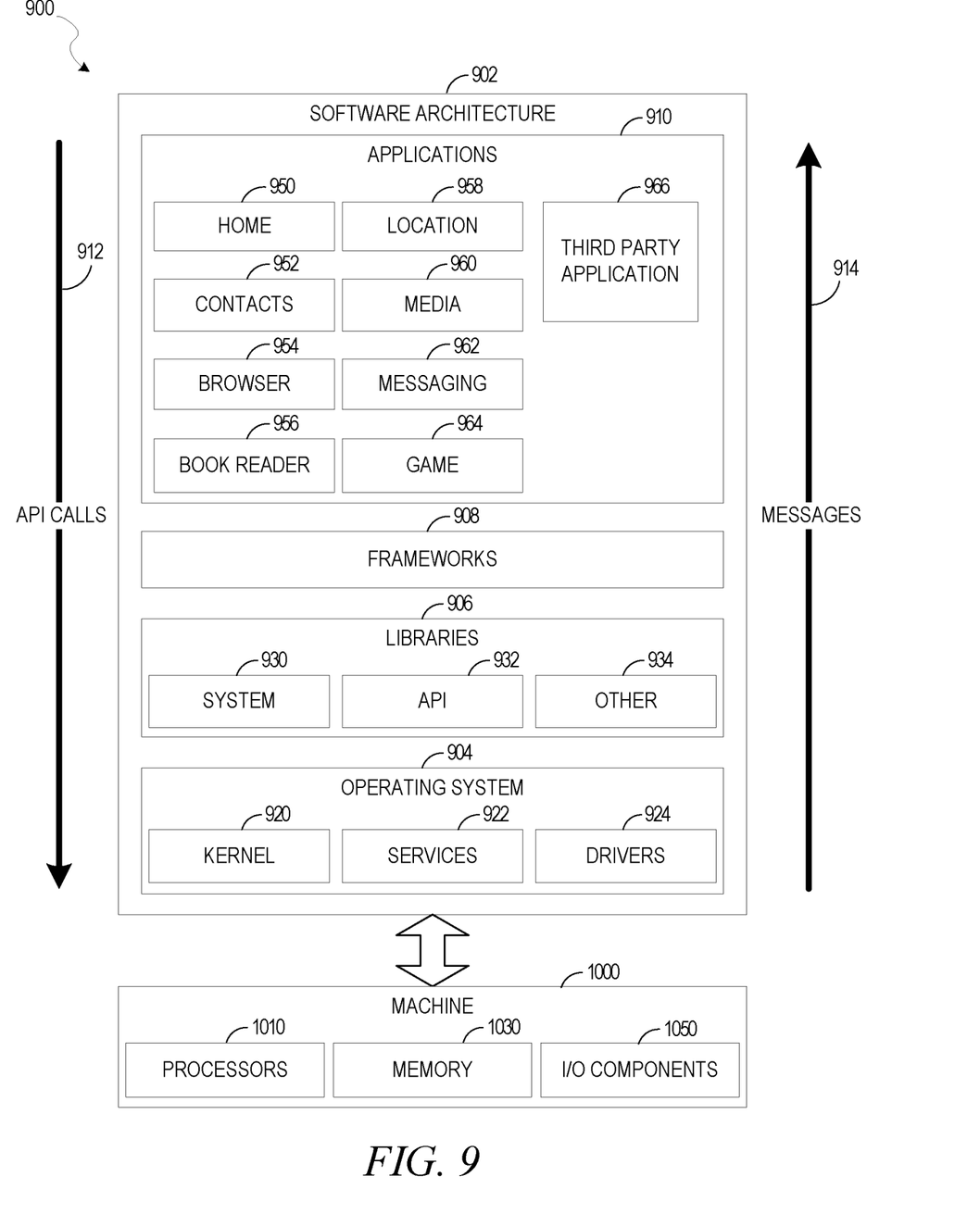
FIG. 9 is a block diagram illustrating a software architecture, which can be installed on any one or more of the devices described above.

FIG. 9 is a block diagram 900 illustrating a software architecture 902, which can be installed on any one or more of the devices described above. FIG. 9 is merely a non-limiting example of a software architecture, and it will be appreciated that many other architectures can be implemented to facilitate the functionality described herein. In various embodiments, the software architecture 902 is implemented by hardware such as a machine 1000 of FIG. 10 that includes processors 1010, memory 1030, and input/output (I/O) components 1050. In this example architecture, the software architecture 902 can be conceptualized as a stack of layers where each layer may provide a particular functionality. For example, the software architecture 902 includes layers such as an operating system 904, libraries 906, frameworks 908, and applications 910. Operationally, the applications 910 invoke Application Program Interface (API) calls 912 through the software stack and receive messages 914 in response to the API calls 912, consistent with some embodiments.

In various implementations, the operating system 904 manages hardware resources and provides common services. The operating system 904 includes, for example, a kernel 920, services 922, and drivers 924. The kernel 920 acts as an abstraction layer between the hardware and the other software layers, consistent with some embodiments. For example, the kernel 920 provides memory management, processor management (e.g., scheduling), component management, networking, and security settings, among other functionality. The services 922 can provide other common services for the other software layers. The drivers 924 are responsible for controlling or interfacing with the underlying hardware. For instance, the drivers 924 can include display drivers, camera drivers, BLUETOOTH® or BLUETOOTH® Low-Energy drivers, flash memory drivers, serial communication drivers (e.g., Universal Serial Bus (USB) drivers), Wi-Fi® drivers, audio drivers, power management drivers, and so forth.

In some embodiments, the libraries 906 provide a low-level common infrastructure utilized by the applications 910. The libraries 906 can include system libraries 930 (e.g., C standard library) that can provide functions such as memory allocation functions, string manipulation functions, mathematic functions, and the like. In addition, the libraries 906 can include API libraries 932 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two-dimensional (2D) and three-dimensional (3D) in a graphic context on a display), database libraries (e.g., SQLite to provide various relational database functions), web libraries (e.g., WebKit to provide web browsing functionality), and the like. The libraries 906 can also include a wide variety of other libraries 934 to provide many other APIs to the applications 910.

The frameworks 908 provide a high-level common infrastructure that can be utilized by the applications 910. For example, the frameworks 908 provide various graphical user interface functions, high-level resource management, high-level location services, and so forth. The frameworks 908 can provide a broad spectrum of other APIs that can be utilized by the applications 910, some of which may be specific to a particular operating system 904 or platform.

In an example embodiment, the applications 910 include a home application 950, a contacts application 952, a browser application 954, a book reader application 956, a location application 958, a media application 960, a messaging application 962, a game application 964, and a broad assortment of other applications, such as a third-party application 966. The applications 910 are programs that execute functions defined in the programs. Various programming languages can be employed to create one or more of the applications 910, structured in a variety of manners, such as object-oriented programming languages (e.g., Objective-C, Java, or C++) or procedural programming languages (e.g., C or assembly language). In a specific example, the third-party application 966 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 966 can invoke the API calls 912 provided by the operating system 904 to facilitate functionality described herein.

Figure 10:
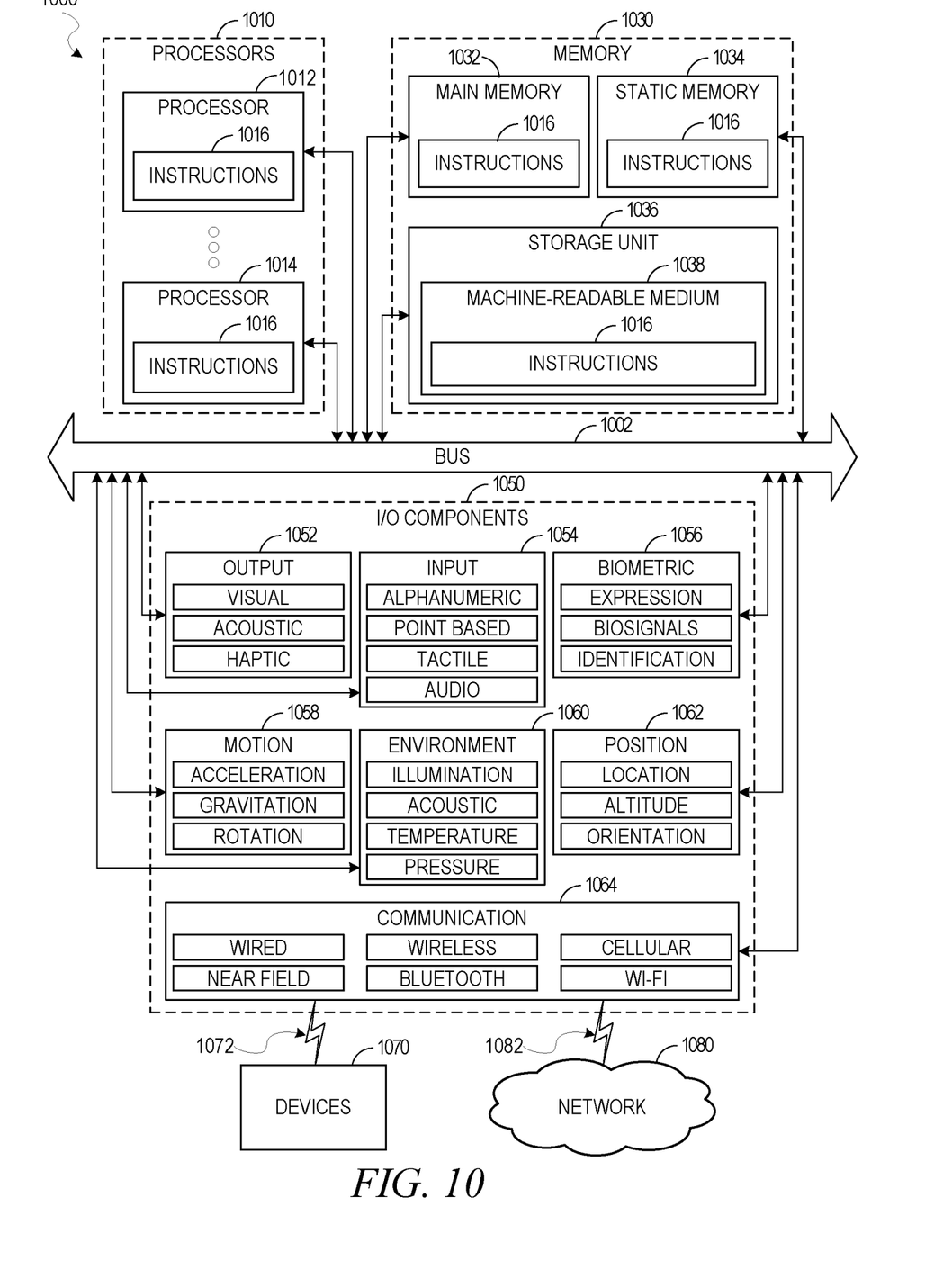
FIG. 10 illustrates a diagrammatic representation of a machine in the form of a computer system within which a set of instructions may be executed for causing the machine to perform any one or more of the methodologies discussed herein.

FIG. 10 illustrates a diagrammatic representation of a machine 1000 in the form of a computer system within which a set of instructions may be executed for causing the machine 1000 to perform any one or more of the methodologies discussed herein. Specifically, FIG. 10 shows a diagrammatic representation of the machine 1000 in the example form of a computer system, within which instructions 1016 (e.g., software, a program, an application, an applet, an app, or other executable code) cause the machine 1000 to perform any one or more of the methodologies discussed herein to be executed. For example, the instructions 1016 may cause the machine 1000 to execute the method of FIG. 8. Additionally, or alternatively, the instructions 1016 may implement FIGS. 1-8 and so forth. The instructions 1016 transform the general, non-programmed machine 1000 into a particular machine 1000 programmed to carry out the described and illustrated functions in the manner described. In alternative embodiments, the machine 1000 operates as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 1016, sequentially or otherwise, that specify actions to be taken by the machine 1000. Further, while only a single machine 1000 is illustrated, the term "machine" shall also be taken to include a collection of machines 1000 that individually or jointly execute the instructions 1016 to perform any one or more of the methodologies discussed herein.

The machine 1000 may include processors 1010, memory 1030, and I/O components 1050, which may be configured to communicate with each other such as via a bus 1002. In an example embodiment, the processors 1010 (e.g., a CPU, a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1012 and a processor 1014 that may execute the instructions 1016. The term "processor" is intended to include multi-core processors that may comprise two or more independent processors (sometimes referred to as "cores") that may execute instructions 1016 contemporaneously. Although FIG. 10 shows multiple processors 1010, the machine 1000 may include a single processor 1012 with a single core, a single processor 1012 with multiple cores (e.g., a multi-core processor 1012), multiple processors 1012, 1014 with a single core, multiple processors 1012, 1014 with multiple cores, or any combination thereof.

The memory 1030 may include a main memory 1032, a static memory 1034, and a storage unit 1036, each accessible to the processors 1010 such as via the bus 1002. The main memory 1032, the static memory 1034, and the storage unit 1036 store the instructions 1016 embodying any one or more of the methodologies or functions described herein. The instructions 1016 may also reside, completely or partially, within the main memory 1032, within the static memory 1034, within the storage unit 1036, within at least one of the processors 1010 (e.g., within the processor's cache memory), or any suitable combination thereof, during execution thereof by the machine 1000.

The I/O components 1050 may include a wide variety of components to receive input, provide output, produce output, transmit information, exchange information, capture measurements, and so on. The specific I/O components 1050 that are included in a particular machine will depend on the type of machine. For example, portable machines such as mobile phones will likely include a touch input device or other such input mechanisms, while a headless server machine will likely not include such a touch input device. It will be appreciated that the I/O components 1050 may include many other components that are not shown in FIG. 10. The I/O components 1050 are grouped according to functionality merely for simplifying the following discussion, and the grouping is in no way limiting. In various example embodiments, the I/O components 1050 may include output components 1052 and input components 1054. The output components 1052 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 1054 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

In further example embodiments, the I/O components 1050 may include biometric components 1056, motion components 1058, environmental components 1060, or position components 1062, among a wide array of other components. For example, the biometric components 1056 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1058 may include acceleration sensor components (e.g., accelerometer), gravitation sensor components, rotation sensor components (e.g., gyroscope), and so forth. The environmental components 1060 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 1062 may include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1050 may include communication components 1064 operable to couple the machine 1000 to a network 1080 or devices 1070 via a coupling 1082 and a coupling 1072, respectively. For example, the communication components 1064 may include a network interface component or another suitable device to interface with the network 1080. In further examples, the communication components 1064 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1070 may be another machine or any of a wide variety of peripheral devices (e.g., coupled via a USB).

Moreover, the communication components 1064 may detect identifiers or include components operable to detect identifiers. For example, the communication components 1064 may include radio-frequency identification (RFID) tag reader components, NFC smart tag detection components, optical reader components (e.g., an optical sensor to detect one-dimensional bar codes such as Universal Product Code (UPC) bar codes, multi-dimensional bar codes such as QR code, Aztec codes, Data Matrix, Dataglyph, Maxi Code, PDF417, Ultra Code, UCC RSS-2D bar code, and other optical codes), or acoustic detection components (e.g., microphones to identify tagged audio signals). In addition, a variety of information may be derived via the communication components 1064, such as location via Internet Protocol (IP) geolocation, location via Wi-Fi® signal triangulation, location via detecting an NFC beacon signal that may indicate a particular location, and so forth.

The various memories (i.e., 1030, 1032, 1034, and/or memory of the processor(s) 1010) and/or the storage unit 1036 may store one or more sets of instructions 1016 and data structures (e.g., software) embodying or utilized by any one or more of the methodologies or functions described herein. These instructions (e.g., the instructions 1016), when executed by the processor(s) 1010, cause various operations to implement the disclosed embodiments.

As used herein, the terms "machine-storage medium," "device-storage medium," and "computer-storage medium" mean the same thing and may be used interchangeably. The terms refer to single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

In various example embodiments, one or more portions of the network 1080 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1080 or a portion of the network 1080 may include a wireless or cellular network, and the coupling 1082 may be a Code Division Multiple Access (CDMA) connection, a Global System for Mobile communications (GSM) connection, or another type of cellular or wireless coupling. In this example, the coupling 1082 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 5G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

The instructions 1016 may be transmitted or received over the network 1080 using a transmission medium via a network interface device (e.g., a network interface component included in the communication components 1064) and utilizing any one of a number of well-known transfer protocols (e.g., Hypertext Transfer Protocol (HTTP)). Similarly, the instructions 1016 may be transmitted or received using a transmission medium via the coupling 1072 (e.g., a peer-to-peer coupling) to the devices 1070. The terms "transmission medium" and "signal medium" mean the same thing and may be used interchangeably in this disclosure. The terms "transmission medium" and "signal medium" shall be taken to include any intangible medium that is capable of storing, encoding, or carrying the instructions 1016 for execution by the machine 1000, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

What is claimed is:

1. A system comprising:
   one or more image data sources;
   a computer system comprising at least one hardware processor and a non-transitory computer-readable medium storing instructions that, when executed by the at least one hardware processor, cause the at least one hardware processor to perform operations comprising:
   accessing a first plurality of images from the one or more data sources;
   training a defect convolutional neural network using the first plurality of images and a plurality of defect label masks, each defect label mask identifying, for each pixel of a corresponding image, whether the pixel depicts a portion of a defect of one or more defect types;
   accessing a second plurality of images from the one or more data sources; and
   training a location convolutional neural network using the second plurality of images and a plurality of location label masks, each location label mask identifying, for each pixel of a corresponding image, a degree in which the pixel depicts a region of interest, the degree being at a maximum for pixels located on a geometric shape specified on the corresponding image by a user, the degree being assigned based on a distance from the geometric shape for pixels surrounding the pixels located on the geometric shape.

2. The system of claim 1, wherein the operations further comprise:
   passing an input image through the defect convolutional neural network, producing first results;
   passing the input image through the location convolutional neural network, producing second results; and
   combining the first and second results to provide a prediction of a location and type of one or more defects in items depicted in the input image.

3. The system of claim 1, wherein the combining utilizes a script specified by a user.

4. The system of claim 1, wherein the first plurality of images are accessed from a different data source than the second plurality of images.

5. The system of claim 1, wherein the geometric shape is a point.

6. The system of claim 1, wherein the geometric shape is a line.

7. The system of claim 1, wherein the geometric shape is a circle.

8. The system of claim 1, wherein the defect label masks are obtained via an interactive labeler where a user draws a boundary around a region of interest in an image.

9. A method comprising:
   accessing a first plurality of images from the one or more data sources;
   training a defect convolutional neural network using the first plurality of images and a plurality of defect label masks, each defect label mask identifying, for each pixel of a corresponding image, whether the pixel depicts a portion of a defect of one or more defect types;
   accessing a second plurality of images from the one or more data sources; and
   training a location convolutional neural network using the second plurality of images and a plurality of location label masks, each location label mask identifying, for each pixel of a corresponding image, a degree in which the pixel depicts a region of interest, the degree being at a maximum for pixels located on a geometric shape specified on the corresponding image by a user, the degree being assigned based on a distance from the geometric shape for pixels surrounding the pixels located on the geometric shape.

10. The method of claim 9, further comprising:
    passing an input image through the defect convolutional neural network, producing first results;
    passing the input image through the location convolutional neural network, producing second results; and
    combining the first and second results to provide a prediction of a location and type of one or more defects in items depicted in the input image.

11. The method of claim 9, wherein the combining utilizes a script specified by a user.

12. The method of claim 9, wherein the first plurality of images are accessed from a different data source than the second plurality of images.

13. The method of claim 9, wherein the geometric shape is a point.

14. The method of claim 9, wherein the geometric shape is a line.

15. The method of claim 9, wherein the geometric shape is a circle.

16. The method of claim 9, wherein the defect label masks are obtained via an interactive labeler where a user draws a boundary around a region of interest in an image.

17. A non-transitory machine-readable storage medium having embodied thereon instructions executable by one or more machines to perform operations comprising:
- accessing a first plurality of images from the one or more data sources;
- training a defect convolutional neural network using the first plurality of images and a plurality of defect label masks, each defect label mask identifying, for each pixel of a corresponding image, whether the pixel depicts a portion of a defect of one or more defect types;
- accessing a second plurality of images from the one or more data sources; and
- training a location convolutional neural network using the second plurality of images and a plurality of location label masks, each location label mask identifying, for each pixel of a corresponding image, a degree in which the pixel depicts a region of interest, the degree being at a maximum for pixels located on a geometric shape specified on the corresponding image by a user, the degree being assigned based on a distance from the geometric shape for pixels surrounding the pixels located on the geometric shape.

18. The non-transitory machine-readable storage medium of claim 17, wherein the operations further comprise:
- passing an input image through the defect convolutional neural network, producing first results;
- passing the input image through the location convolutional neural network, producing second results; and
- combining the first and second results to provide a prediction of a location and type of one or more defects in items depicted in the input image.

19. The non-transitory machine-readable storage medium of claim 17, wherein the combining utilizes a script specified by a user.

20. The non-transitory machine-readable storage medium of claim 17, wherein the first plurality of images are accessed from a different data source than the second plurality of images.

* * * * *